(12) United States Patent
Aoki et al.

(10) Patent No.: US 10,471,707 B2
(45) Date of Patent: Nov. 12, 2019

(54) SUBLIMATION TRANSFER INK JET INK COMPOSITION AND SUBLIMATION TRANSFER INK JET RECORDING METHOD

(71) Applicant: Seiko Epson Corporation, Tokyo (JP)

(72) Inventors: Katsuko Aoki, Kiso-Machi (JP); Shugo Hattori, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/044,910

(22) Filed: Jul. 25, 2018

(65) Prior Publication Data

US 2019/0030882 A1 Jan. 31, 2019

(30) Foreign Application Priority Data

Jul. 26, 2017 (JP) ................. 2017-144813

(51) Int. Cl.
| | | |
|---|---|---|
| C09D 11/30 | (2014.01) | |
| B41J 2/005 | (2006.01) | |
| B41J 2/01 | (2006.01) | |
| B41M 5/035 | (2006.01) | |
| C09D 11/328 | (2014.01) | |
| C09D 11/00 | (2014.01) | |

(52) U.S. Cl.
CPC ............. *B41J 2/0057* (2013.01); *B41J 2/01* (2013.01); *B41M 5/0356* (2013.01); *C09D 11/00* (2013.01); *C09D 11/30* (2013.01); *C09D 11/328* (2013.01)

(58) Field of Classification Search
CPC ........... B41J 2/0057; B41J 2/01; C09D 11/30; C09D 11/00; C09D 11/328; B41M 5/0356
See application file for complete search history.

(56) References Cited

U.S. PATENT DOCUMENTS

| | | | |
|---|---|---|---|
| 2002/0157569 A1 | 10/2002 | Takemoto et al. | |
| 2005/0093947 A1 | 5/2005 | Maekawa et al. | |
| 2005/0143490 A1 | 6/2005 | Takemoto et al. | |
| 2013/0176369 A1* | 7/2013 | Gotou ................. | B41J 2/2107 347/100 |
| 2014/0123406 A1* | 5/2014 | Ikeda ................. | D06P 5/004 8/471 |
| 2016/0208119 A1 | 7/2016 | Oguchi et al. | |
| 2018/0319190 A1 | 11/2018 | Hirokawa et al. | |

FOREIGN PATENT DOCUMENTS

| | | |
|---|---|---|
| JP | 2003-253166 A | 9/2003 |
| JP | 2004-107647 A | 4/2004 |
| JP | 2015-091907 A | 5/2015 |
| JP | 2015-093956 A | 5/2015 |
| JP | 2015-117297 A | 6/2015 |
| WO | WO-2017-119040 A1 | 7/2017 |

OTHER PUBLICATIONS

Extended European Search Report for EP Application No. 18185610.5, dated Nov. 30, 2018; (7 pages).

* cited by examiner

*Primary Examiner* — Yaovi M Ameh
(74) *Attorney, Agent, or Firm* — Harness, Dickey & Pierce, P.L.C.

(57) ABSTRACT

A sublimation transfer ink jet ink composition includes: a disperse dye; a dispersing resin; a silicone-based surfactant; and a solubilizer. The ink composition has a surface tension of 30 mN/m or less, and a cloud point of a mixture which includes all the components other than the disperse dye and the dispersing resin is 40° C. or more.

9 Claims, No Drawings

SUBLIMATION TRANSFER INK JET INK COMPOSITION AND SUBLIMATION TRANSFER INK JET RECORDING METHOD

BACKGROUND

1. Technical Field

The present invention relates to a sublimation transfer ink jet ink composition and a sublimation transfer ink jet recording method.

2. Related Art

An ink jet recording method is a method in which small droplets of an ink are ejected from fine nozzles so as to be adhered to a recording medium for recording. This method has advantages in that an image having a high quality and a high resolution can be recorded at a high speed using a relatively inexpensive device. In the ink jet recording method, there has been a significant large number of elements to be studied, such as the property of an ink to be used, the stability in recording, and the quality of an image to be obtained, and hence, research has been aggressively carried out not only on an ink jet recording device but also on an ink jet ink composition.

In addition, by the use of an ink jet recording method, dyeing (printing) of a cloth or the like has also been performed. Heretofore, as a printing method performed on a cloth (a woven cloth or a nonwoven cloth), although a screen printing method, a roller printing method, or the like has been used, in view of production of many models in small quantities and immediate printability, since an ink jet recording method can be advantageously used, various studies thereon have been carried out.

For example, JP-A-2015-091907 has disclosed an ink jet printing ink containing a silicone-based surfactant and a disperse dye dispersed by a resin.

SUMMARY

As one printing method, a sublimation transfer type printing method using a sublimation type dye may be mentioned. The printing method described above is a method to obtain a printed material in such a way that an ink jet ink composition is not directly adhered to a medium to be printed (such as a cloth), but after an ink jet ink composition designed for sublimation transfer is adhered to a transfer medium (such as paper) which is used as a transfer source, the dye is transferred from the transfer medium to the medium to be printed.

On the other hand, when a dye, such as a disperse dye, which is not dissolved or hardly dissolved in water is contained in an ink, as a method to disperse this dye, a naphthalene-based dispersant has been used in some cases. However, this naphthalene-based dispersant may generate an odor in some cases. Since a sublimation transfer ink is heated when being transferred, by the use of this type of dispersant, the odor may become a problem in some cases.

Accordingly, in the ink jet printing ink described in JP-A-2015-091907, a disperse dye which can be used for sublimation transfer is dispersed by a dispersing resin. In the case of the ink as described above, it is believed that since a naphthalene-based dispersant may not be used, the odor can be suppressed.

In addition, in the ink described in JP-A-2015-091907, a silicone-based surfactant is also contained. According to the study performed by the present inventor, it has become clear that when a silicone-based surfactant is added to an ink in which a disperse dye is dispersed by a dispersing resin, although an initial surface tension is decreased, since the surface tension is gradually increased during a long-term storage, in association with this increase, a filling property into a head and an ejection stability are degraded, and as a result, the image quality to be obtained is degraded. In addition, it has also become clear that the degradation as described above is partially caused by the interaction between the silicone-based surfactant and the dispersing resin.

One object according to the aspects of the invention is to provide a sublimation transfer ink jet ink composition which can be printed while an odor is suppressed, which has a preferable filling property into a head, and which has an excellent storage stability so that the physical properties are not likely to be changed during storage. In addition, another object according to the aspects of the invention is to provide a sublimation transfer ink jet recording method which can perform a printing having a preferable image quality while an odor is suppressed.

The invention was made in order to achieve the objects described above and can be realized by the following aspects or application examples.

A sublimation transfer ink jet ink composition according to one aspect of the invention comprises: a disperse dye; a dispersing resin; a silicone-based surfactant; and a solubilizer. The ink jet ink composition described above has a surface tension of 30 mN/m or less, and a cloud point of a mixture which includes all the components other than the disperse dye and the dispersing resin is 40° C. or more.

The sublimation transfer ink jet ink composition as described above suppresses an odor generated during printing, has a preferable filling property into a head, and is also excellent in storage stability so that the physical properties are not likely to be changed during storage. That is, since the sublimation transfer ink jet ink composition described above includes the dispersing resin, the dispersibility of the disperse dye is not only improved, but also the odor generated during printing is suppressed, and in addition, since the solubilizer which can appropriately set the cloud point (of the mixture which includes all the components other than the disperse dye and the dispersing resin) is included, the interaction between the dispersing resin and the silicone-based surfactant is suppressed, and as a result, an effect of improving the filling property into the head and an effect of decreasing the surface tension, each of which is obtained by the silicone-based surfactant, are not likely to be changed with time. Accordingly, for example, even after the sublimation transfer ink jet ink composition is stored, since the initial physical properties thereof can be maintained, the change in image quality of a printed material can be made unlikely to occur before and after the storage.

In the sublimation transfer ink jet ink composition according to the invention, the solubilizer may be at least one selected from an alkyldiphenyl ether disulfonic acid, a salt thereof, and a polyoxyethylene styrenated phenyl ether.

According to the sublimation transfer ink jet ink composition as described above, the silicone-based surfactant is more easily solubilized and is more likely to be suppressed from being adsorbed on the dispersing resin. Hence, the ability of decreasing the surface tension of the composition is likely to be maintained, and for example, even after the sublimation transfer ink jet ink composition is stored, the initial physical properties can be more reliably maintained.

In the sublimation transfer ink jet ink composition according to the invention, the dispersing resin may be at least one selected from an acryl-based resin, a styrene-based resin, and an urethane-based resin.

According to the sublimation transfer ink jet ink composition as described above, the disperse dye can be more preferably dispersed.

In the sublimation transfer ink jet ink composition according to the invention, the mass rate (dispersing resin/disperse dye) of the dispersing resin to the disperse dye may be 20% to 200%.

According to the sublimation transfer ink jet ink composition as described above, the disperse dye can be more preferably dispersed.

In the sublimation transfer ink jet ink composition according to the invention, the disperse dye may contain at least one selected from DR60, DY54, DB359, DB360, DO25, and SO60.

According to the sublimation transfer ink jet ink composition as described above, a more preferable printing can be performed.

A sublimation transfer ink jet recording method according to one aspect of the invention comprises: an ejection step of ejecting the sublimation transfer ink jet ink composition described above from a recording head so that the ink composition is adhered to an intermediate transfer medium; and a transfer step of transferring the sublimation transfer ink jet ink composition to a cloth for recording.

According to the sublimation transfer ink jet recording method as described above, an odor is suppressed, and at the same time, a printing having a preferable image quality can be performed.

In addition, DR60, DY54, DB359, DB360, DO25, and SO60 described above are abbreviations of C. I. Direct Red 60, C. I. Direct Yellow 54, C. I. Direct Blue 359, C. I. Direct Blue 360, C. I. Direct Orange 25, and C. I. Solvent Orange 60, respectively. In addition, "C. I." is an abbreviation of Color Index.

DESCRIPTION OF EXEMPLARY EMBODIMENTS

Hereinafter, embodiments of the invention will be described. The following embodiments are each described to illustrate one example of the invention. The invention is not limited at all to the following embodiments and may include various modified embodiments to be performed without departing from the scope of the invention. In addition, all the structures to be described below are each not always required to be an essential structure of the invention.

1. Sublimation Transfer Ink Jet Ink Composition

A sublimation transfer ink jet ink composition of this embodiment includes a disperse dye, a dispersing resin, a silicone-based surfactant, and a solubilizer.

1.1. Disperse Dye

The sublimation transfer ink jet ink composition of this embodiment includes a disperse dye. The disperse dye is one sublimation type dye, is a dye preferably used for dyeing of hydrophobic synthetic fibers of a polyester, a nylon, an acetate, or the like, and is a compound insoluble or hardly soluble in water. In addition, the disperse dye is a dye having a sublimation property when heated. Although the disperse dye to be used for the sublimation transfer ink jet ink composition of this embodiment is not particularly limited, in particular, for example, the following compounds may be mentioned. In addition, in the following dyes shown by way of example, although a dye classified in an oil-soluble dye is also included, in this specification, an oil-soluble dye which is not water soluble but is dispersed in water is regarded as one type of disperse dye.

As a yellow-based disperse dye, for example, there may be mentioned C. I. Disperse Yellow 1, 3, 4, 5, 7, 8, 9, 13, 16, 23, 24, 30, 31, 33, 34, 39, 41, 42, 44, 49, 50, 51, 54, 56, 58, 60, 61, 63, 64, 66, 68, 71, 74, 76, 77, 78, 79, 82, 83, 85, 86, 88, 90, 91, 93, 98, 99, 100, 104, 108, 114, 116, 118, 119, 122, 124, 126, 135, 140, 141, 149, 153, 160, 162, 163, 164, 165, 179, 180, 182, 183, 184, 186, 192, 198, 199, 201, 202, 204, 210, 211, 215, 216, 218, 224, 227, 231, 232, 233, or 245; or C. I. Solvent Yellow 2, 6, 14, 16, 21, 25, 29, 30, 33, 51, 56, 77, 80, 82, 88, 89, 93, 116, 150, 163, or 179. In addition, "C. I. Disperse Yellow" and "C. I. Solvent Yellow" may be abbreviated as "DY" and "SY", respectively, in some cases.

As an orange-based disperse dye, for example, there may be mentioned C. I. Disperse Orange 1, 1: 1, 3, 5, 7, 11, 13, 17, 20, 21, 25, 25:1, 29, 30, 31, 32, 33, 37, 38, 41, 42, 43, 44, 45, 46, 47, 48, 49, 50, 51, 53, 54, 55, 56, 57, 58, 59, 61, 66, 71, 73, 76, 78, 80, 89, 90, 91, 93, 96, 97, 119, 127, 130, 139, or 142; or C. I. Solvent Orange 1, 2, 14, 45, or 60. In addition, "C. I. Disperse Orange" and "C. I. Solvent Orange" may be abbreviated as "DO" and "SO", respectively, in some cases.

As a red-based disperse dye, for example, there may be mentioned C. I. Disperse Red 1, 4, 5, 6, 7, 11, 12, 13, 15, 17, 27, 43, 44, 50, 52, 53, 54, 55, 55:1, 56, 58, 59, 60, 65, 70, 72, 73, 74, 75, 76, 78, 81, 82, 83, 84, 86, 86: 1, 88, 90, 91, 92, 93, 96, 97, 99, 100, 101, 103, 104, 105, 106, 107, 108, 110, 111, 113, 116, 117, 118, 121, 122, 125, 126, 127, 128, 129, 131, 132, 134, 135, 137, 143, 145, 146, 151, 152, 153, 154, 157, 158, 159, 164, 167, 167: 1, 169, 177, 179, 181, 183, 184, 185, 188, 189, 190, 190: 1, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, or 328; or C. I. Solvent Red 1, 3, 7, 8, 9, 18, 19, 23, 24, 25, 27, 49, 100, 109, 121, 122, 125, 127, 130, 132, 135, 218, 225, or 230. In addition, "C. I. Disperse Red" and "C. I. Solvent Red" may be abbreviated as "DR" and "SR", respectively, in some cases.

As a violet-based disperse dye, for example, there may be mentioned C. I. Disperse Violet 1, 4, 8, 10, 17, 18, 23, 24, 26, 27, 28, 29, 30, 31, 33, 35, 36, 37, 38, 40, 43, 46, 48, 50, 51, 52, 56, 57, 59, 61, 63, 69, or 77; or C. I. Solvent Violet 13. In addition, "C. I. Disperse Violet" and "C. I. Solvent Violet" may be abbreviated as "DV" and "SV", respectively, in some cases.

As a green-based disperse dye, for example, there may be mentioned C. I. Disperse Green 9 or C. I. Solvent Green 3. In addition, "C. I. Disperse Green" and "C. I. Solvent Green" may be abbreviated as "DG" and "SG", respectively, in some cases.

As a brown-based disperse dye, for example, there may be mentioned C. I. Disperse Brown 1, 2, 4, 9, 13, or 19; or C. I. Solvent Brown 3 or 5. In addition, "C. I. Disperse Brown" and "C. I. Solvent Brown" may be abbreviated as "DBr" and "SBr", respectively, in some cases.

As a blue-based disperse dye, for example, there may be mentioned C. I. Disperse Blue 3, 5, 6, 7, 9, 14, 16, 19, 20, 24, 26, 26:1, 27, 35, 43, 44, 52, 54, 55, 56, 58, 60, 61, 62, 64, 64:1, 71, 72, 72:1, 73, 75, 77, 77:1, 79, 81, 81:1, 82, 83, 85, 87, 88, 90, 91, 93, 94, 95, 96, 99, 102, 106, 108, 112, 113, 115, 118, 120, 122, 125, 128, 130, 131, 139, 141, 142, 143, 145, 146, 148, 149, 153, 154, 158, 165, 167, 171, 173, 174, 176, 181, 183, 185, 186, 187, 189, 197, 198, 200, 201, 205, 207, 211, 214, 224, 225, 241, 257, 259, 267, 268, 270, 284, 285, 287, 288, 291, 293, 295, 297, 301, 315, 330, 333, 354, 359, 360, or 367; or C. I. Solvent Blue 2, 11, 14, 24, 25, 35, 36, 38, 48, 55, 59, 63, 67, 68, 70, 73, 83, 105, 111, or 132. In addition, "C. I. Disperse Blue" and "C. I. Solvent Blue" may be abbreviated as "DB" and "SB", respectively, in some cases.

As a black-based disperse dye, for example, there may be mentioned C. I. Disperse Black 1, 2, 3, 10, 24, 26, 27, 28, 30, or 31; or C.I. Solvent Black 3, 5, 7, 23, 27, 28, 29, or 34. In addition, "C. I. Disperse Black" and "C. I. Solvent Black" may be abbreviated as "DBk" and "SBk", respectively, in some cases.

The disperse dyes mentioned above by way of example may be used alone, or at least two types thereof may be used in combination.

The disperse dyes mentioned above by way of example are each a sublimation type dye having a sublimation property. In this embodiment, the "sublimation type dye" is a dye having a sublimation property when being heated. The dye as described above is preferably used for dyeing (printing) of a cloth or the like using sublimation transfer. As a printing method using the sublimation transfer as described above, for example, there may be mentioned a method in which after printing is performed by an ink jet method on a sheet-shaped intermediate transfer medium (transfer source), such as paper, using an ink containing a sublimation type dye, the intermediate transfer medium is overlapped on a recording medium, such as a cloth, and the sublimation transfer is performed by heating, and a method in which after printing is performed by an ink jet method on a strippable ink receiving layer provided on a recording medium (such as a film product) using a sublimation transfer ink, heating is performed in the state as described above so as to perform a sublimation diffusion dyeing on the recording medium located at a lower side, and furthermore, the ink receiving layer is then stripped away.

Among the disperse dyes mentioned above by way of example, in view of a color developing property and a storage stability of the composition, the sublimation transfer ink jet ink composition of this embodiment preferably contains at least one selected from DR60, DY54, DB359, DB360, DO25, and SO60. When the disperse dye as described above is selected, a printing having a preferable color developing property is obtained, and even after the storage of the composition, a preferable printing can also be performed.

Although the disperse dyes mentioned above by way of example are each a compound insoluble or hardly soluble in water, for example, by the dispersing resin which will be described below, the disperse dyes each can be preferably dispersed (in the case of an oil-soluble dye, this dispersion state is also called emulsification) in water when the concentration range thereof is specified. In addition, the disperse dyes mentioned above by way of example have dispersibilities slightly different from each other. That is, depending on the type of disperse dye, a preferable concentration range of the dispersing resin is changed, and depending on the type of dispersing resin, the dispersibility of the disperse dye may also be changed.

The content of the total disperse dye with respect to 100 percent by mass of the sublimation transfer ink jet ink composition is 10 percent by mass or less, preferably 0.1 to 10 percent by mass, more preferably 0.2 to 9.0 percent by mass, and further preferably 0.3 to 7.0 percent by mass. When the content of the disperse dye is approximately in the range as described above, the color developing property (OD value) of a printed material to be obtained can be sufficiently obtained.

1.2. Dispersing Resin

The sublimation transfer ink jet ink composition of this embodiment includes a dispersing resin dispersing a disperse dye. The disperse dye is dispersed by the dispersing resin, and the dispersing resin has a function of dispersing (or emulsifying) the disperse dye in the sublimation transfer ink jet ink composition. Although the dispersing resin is not particularly limited, the following resins may be mentioned by way of example.

As the dispersing resin, for example, there may be mentioned an acryl-based resin or a salt thereof, such as a poly(acrylic acid), an acrylic acid-acrylonitrile copolymer, an acrylic acid-acrylate copolymer, a vinyl acetate-acrylate copolymer, a vinyl acetate-acrylic acid copolymer, a styrene-acrylic acid copolymer, a styrene-methacrylic acid copolymer, a styrene-methacrylic acid-acrylate copolymer, a styrene-α-methylstyrene-acrylic acid copolymer, a styrene-α-methylstyrene-acrylic acid-acrylate copolymer, or a vinyl-naphthalene-acrylic acid copolymer; a styrene-based resin or a salt thereof, such as a styrene-acrylic acid copolymer, a styrene-methacrylic acid copolymer, a styrene-methacrylic acid-acrylate copolymer, a styrene-α-methylstyrene-acrylic acid copolymer, a styrene-α-methylstyrene-acrylic acid-acrylate copolymer, a styrene-maleic acid copolymer, or a styrene-maleic anhydride copolymer; an urethane-based resin or a salt thereof, such as a linear and/or a branched high molecular weight compound (resin) having an urethane bond formed by a reaction between an isocyanate group and a hydroxyl group regardless of whether being cross-linked or not; a poly(vinyl alcohol), a poly(vinyl pyrrolidone), a vinylnaphthalene-maleic acid copolymer or a salt thereof, a vinyl acetate-maleate copolymer or a salt thereof, or a vinyl acetate-crotonic acid copolymer or a salt thereof.

As a commercially available product of the styrene-based dispersing resin, for example, there may be mentioned X-200, X-1, X-205, or X-220 (manufactured by Seiko PMC Corporation), or Nopco Sperse 6100 (manufactured by San Nopco Limited). As a commercially available product of the acryl-based resin dispersant, for example, there may be mentioned BYK-190, BYK-187, BYK-191, BYK-194N, or BYK-199 (manufactured by BYK-Chemie), or Aron A-6114 (manufactured by Toagosei Co., Ltd.). As a commercially available product of the urethane-based resin dispersant, for example, there may be mentioned BYK-184, BYK-182, BYK-183, or BYK-185 (manufactured by BYK-Chemie), or TEGO Disperse 710 (manufactured by Evonic Tego Chemie).

The dispersing resins may be used alone, or at least two types thereof may be used in combination. The content of the total dispersing resin with respect to 100 percent by mass of the sublimation transfer ink jet ink composition is 0.1 to 20 percent by mass, preferably 0.5 to 10 percent by mass, more preferably 1 to 8 percent by mass, and further preferably 1.5 to 5 percent by mass. Since the content of the dispersing resin is 0.1 percent by mass or more, the dispersion stability of the disperse dye can be secured. In addition, when the content of the dispersing resin is 20 percent by mass or less, the viscosity of the composition can be controlled in an appropriate range.

Furthermore, the content of the total dispersing resin is preferably set so that the mass rate (total dispersing resin/total disperse dye) of the dispersing resin to the disperse dye is 20% to 200%. In addition, the mass rate of the dispersing resin to the disperse dye is more preferably 30% to 150%, further preferably 40% to 100%, and particularly preferably 40% to 60%. When the mass rate is set as described above, since the amount of the dispersing resin to that of the disperse dye is preferable, the disperse dye can be more preferably dispersed.

In addition, among the dispersing resins mentioned above by way of example, at least one selected from the acryl-based resin, the styrene-based resin, and the urethane-based resin is more preferable. When the resin as described above is used as the dispersing resin, the dispersion stability of the disperse dye can be further improved.

By the study carried out by the inventors, it has become clear that when being present in the composition together with a silicone-based surfactant which will be described later, the dispersing resin as described above is likely to adsorb the silicone-based surfactant. Even if a dispersing resin having the property as described above is used, since the solubilizer is included in the sublimation transfer ink jet ink composition of this embodiment, it is believed that the adsorption of the silicone-based surfactant is suppressed or that the silicone-based surfactant can be solubilized. Accordingly, since the surface tension of the sublimation transfer ink jet ink composition can be preferably maintained for a long time, the storage stability can be improved.

That is, in order to suppress the odor generated when the disperse dye is printed, even if the disperse dye is dispersed by using the dispersing resin which may unfavorably cause the interaction with the silicone-based surfactant, the storage stability can be improved, and a preferable image can be formed even after the storage; hence, the effect obtained by the use of the following silicone-based surfactant can be sufficiently used.

1.3. Silicone-Based Surfactant

The sublimation transfer ink jet ink composition of this embodiment includes a silicone-based surfactant. The silicone-based surfactant has functions of decreasing the surface tension of the sublimation transfer ink jet ink composition, securing the filling property into a recording head, and improving the wettability (permeability to a cloth or the like) to a recording medium.

Although the silicone-based surfactant is not particularly limited, a polysiloxane-based compound may be preferably mentioned. Although the polysiloxane-based compound is not particularly limited, for example, a polyether modified organosiloxane may be mentioned. As a commercially available product of this polyether modified organosiloxane, for example, there may be mentioned BYK-306, BYK-307, BYK-333, BYK-341, BYK-345, BYK-346, BYK-348, BYK-349, BYK-378, or BYK-331 (each trade name, manufactured by BYK-Chemie), KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (each trade name, manufactured by Shin-Etsu Chemical Co., Ltd.).

The silicone-based surfactants may be used alone, or at least two types thereof may be used in combination. The content of the total silicone-based surfactant with respect to 100 percent by mass of the sublimation transfer ink jet ink composition is 0.1 to 5 percent by mass, preferably 0.2 to 3 percent by mass, more preferably 0.3 to 1 percent by mass, and further preferably 0.5 to 0.8 percent by mass. Since the content of the silicone-based surfactant is 0.1 percent by mass or more, the filling property of the sublimation transfer ink jet ink composition into a recording head can be improved, and in addition, the surface tension of the composition can be sufficiently decreased. In addition, when the content of the silicone-based surfactant is 5 percent by mass or less, a cloud point of a mixture which includes all the components of the sublimation transfer ink jet ink composition other than the disperse dye and the dispersing resin is likely to be set to 40° C. or more, and an ability of decreasing the surface tension can be sufficiently obtained.

1.4. Solubilizer

The sublimation transfer ink jet ink composition of this embodiment includes a solubilizer. The solubilizer has a function of suppressing a decrease in surface activation ability which is caused by the adsorption of the silicone-based surfactant to the dispersing resin described above. That is, the term "solubilize" in this embodiment indicates that the silicone-based surfactant is stabilized in a liquid phase, and the above term is also used to indicate that the silicone-based surfactant is dissolved. In addition, in order to prevent the adsorption of the silicone-based surfactant, the solubilizer may also be called an adsorption inhibitor. In addition, as one function of the solubilizer, an increase in cloud point of a liquid component (mixture which includes all the components other than the disperse dye and the dispersing resin) may be mentioned. Accordingly, for example, the addition amount of the silicone-based surfactant may be increased in some cases.

As the solubilizer, for example, an alkyldiphenyl ether disulfonic acid, a salt thereof, and a polyoxyethylene styrenated phenyl ether may be mentioned. As a commercially available product of the alkyldiphenyl ether disulfonic acid salt, for example, the Pelex Series, such as Pelex SS-H or SS-L (manufactured by Kao Corporation), may be mentioned. In addition, as a commercially available product of the polyoxyethylene styrenated phenyl ether, Emulgen A-500, A-60, or A-90 (manufactured by Kao Corporation); or the Inogen Series, such as Inogen EA-017, EA-87, EA-137, EA-157, EA-177, EA-197D, or EA-207D (manufactured by DKS Co., Ltd.) may be mentioned by way of example.

In addition, those solubilizers may be used alone, or at least two types thereof may be used in combination. Hence, for example, the printing ink jet ink composition of this embodiment may include at least one selected from an alkyldiphenyl ether disulfonic acid, a salt thereof, and a polyoxyethylene styrenated phenyl ether.

The content of the total solubilizer with respect to 100 percent by mass of the sublimation transfer ink jet ink composition is 0.1 to 5 percent by mass, preferably 0.2 to 3 percent by mass, more preferably 0.3 to 2 percent by mass, and further preferably 0.5 to 1.5 percent by mass. Since the content of the solubilizer is 0.1 percent by mass or more, a sufficient effect of solubilizing the silicone-based surfactant can be obtained, and even if the amount of the silicone-based surfactant is large, the cloud point can be maintained high.

1.5. Other Components 1.5.1 Water-Soluble Organic Solvent

The sublimation transfer ink jet ink composition of this embodiment may include an organic solvent, such as an alkylpolyol or a glycol ether.

AlkylPolyol

As a particular example of the alkylpolyol, for example, there may be mentioned 1,2-butanediol [194° C.], 1,2-pentaneediol [210° C.], 1,2-hexanediol [224° C.], 1,2-heptanediol [227° C.], 1,3-propanediol (propylene glycol) [210° C.], 1,3-butanediol [230° C.], 1,4-butanediol [230° C.], 1,5-pentanediol [242° C.], 1,6-hexanediol [250° C.], 2-ethyl-2-methyl-1,3-propanediol [226° C.], 2-methyl-2-propyl-1,3-propanediol [230° C.], 2-methyl-1,3-propanediol [214° C.], 2,2-dimethyl-1,3-propanediol [210° C.], 3-methyl-1,3-butanediol [203° C.], 2-ethyl-1,3-hexanediol

[244° C.], 3-methyl-1,5-pentanediol [250° C.], 2-methylpentane-2,4-diol [197° C.], diethylene glycol [245° C.], dipropylene glycol [232° C.], triethylene glycol [287° C.], or glycerin [290° C.]. In addition, the numerical value in the parentheses represents a standard boiling point. Those alkylpolyols may be used alone, or at least two types thereof may be used in combination.

When the alkylpolyol is contained, if the content thereof with respect to the total mass of the sublimation transfer ink jet ink composition is 5 percent by mass or more, although the effect can be obtained, the content is preferably 5 to 30 percent by mass, more preferably 8 to 27 percent by mass, and further preferably 10 to 25 percent by mass.

Glycol Ether

As the glycol ether, for example, there may be preferably used a monoalkyl ether of a glycol selected from ethylene glycol, diethylene glycol, triethylene glycol, a poly(ethylene glycol), propylene glycol, dipropylene glycol, tripropylene glycol, a poly(propylene glycol), and a polyoxyethylene polyoxypropylene glycol. In addition, methyl triglycol (triethylene glycol monomethyl ether), butyl triglycol (triethylene glycol monobutyl ether), butyl diglycol (diethylene glycol monobutyl ether), or dipropylene glycol monopropyl ether is more preferable. As a typical example, diethylene glycol monobutyl ether [230° C.] may be mentioned. The numerical value in the parentheses represents a normal boiling point.

At least two types of glycol ethers may be used in combination. In addition, in view of viscosity adjustment of the sublimation transfer ink jet ink composition and clogging inhibition by a moisturizing effect, the content of the total glycol ether with respect to the total sublimation transfer ink jet ink composition is 0.2 to 30 percent by mass, preferably 0.4 to 20 percent by mass, more preferably to 15 percent by mass, and further preferably 2 to 10 percent by mass.

Other Organic Solvents

In addition, as an organic solvent usable for the sublimation transfer ink jet ink composition of this embodiment, for example, a lactone, such as γ-butyrolactone, or a betaine compound may be mentioned. When those organic solvents are used, since the wettability and/or the permeation rate may be controlled in some cases, the color developing property of an image may be improved in some cases.

At least two types of water-soluble organic solvents mentioned above may be used in combination. In addition, in view of viscosity adjustment of the sublimation transfer ink jet ink composition and clogging inhibition by a moisturizing effect, the content of the water-soluble organic solvent described in this column with respect to the total amount is 0.2 to 30 percent by mass, preferably 0.4 to 20 percent by mass, more preferably 0.5 to 15 percent by mass, and further preferably 0.7 to 10 percent by mass.

1.5.2. Surfactant

As long as the surface tension and the cloud point can be set to 30 mN/m or less and 40° C. or more, respectively, the sublimation transfer ink jet ink composition according to this embodiment may further include another surfactant besides the silicone-based surfactant described above. As the surfactant described above, any one of a nonionic surfactant, an anionic surfactant, a cationic surfactant, and an amphoteric surfactant may be used, and furthermore, at least two of those surfactants may also be used in combination.

Although an acetylene glycol-based surfactant is not particularly limited, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (each trade name, manufactured by Air Products and Chemicals. Inc.); or Olfin B, Y, P, A, STG, SPC, E1004, E1010, PD-001, PD-002W, PD-003, PD-004, PD-005, EXP. 4001, EXP. 4036, EXP. 4051, AF-103, AF-104, AK-02, SK-14, or AE-3 (each trade name, manufactured by Nisshin Chemical Industry Co., Ltd.); or Acetynol E00, E00P, E40, or E100 (each trade name, manufactured by Kawaken Fine Chemicals Co., Ltd.).

As a fluorine-containing surfactant, for example, a fluorine-modified polymer is preferably used, and as a particular example, BYK-340 (manufactured by BYK-Chemie) may be mentioned.

When a surfactant other than the silicone-based surfactant is contained in the sublimation transfer ink jet ink composition, the total content thereof with respect to the total composition is 0.01 to 3 percent by mass, preferably 0.05 to 2 percent by mass, further preferably 0.1 to 1.5 percent by mass, and particularly preferably 0.2 to 1 percent by mass.

1.5.3. pH Adjuster

In the sublimation transfer ink jet ink composition of this embodiment, if needed, a pH adjuster may be contained. Although the pH adjuster is not particularly limited, for example, an appropriate combination among an acid, a base, a weak acid, and a weak base may be mentioned. As examples of the acid and the base to be used in combination as described above, for example, sulfuric acid, hydrochloric acid, or nitric acid may be mentioned as an inorganic acid, and as an inorganic base, for example, lithium hydroxide, sodium hydroxide, potassium hydroxide, potassium dihydrogen phosphate, disodium hydrogen phosphate, potassium carbonate, sodium carbonate, sodium hydrogen carbonate, or ammonium may be mentioned. As an organic base, for example, triethanolamine, diethanolamine, monoethanolamine, tripropanolamine, triisopropanolamine, diisopropanolamine, or tris(hydroxymethyl)aminomethane (THAM) may be mentioned, and as an organic acid, for example, there may be used adipic acid, citric acid, succinic acid, lactic acid; a Good buffer, such as N,N-bis(2-hydroxyethyl)-2-aminoethane sulfonic acid (BES), 4-(2-hydroxyethyl)-1-piperdineethane sulfonic acid (HEPES), morpholinoethane sulfonic acid (MES), carbamoylmethylimino bisacetic acid (ADA), piperazine-1,4-bis(2-ethane sulfonic acid) (PIPES), N-(2-acetamide)-2-aminoethane sulfonic acid (ACES), cholamine chloride, N-tris(hydroxymethyl)methyl-2-aminoethane sulfonic acid (TES), acetamide glycine, tricine, glycine amide, or bicine; a phosphoric acid buffer solution, a citric acid buffer solution, or a Tris buffer solution. Furthermore, among those compounds mentioned above, as at least one pH adjuster, a tertiary amine, such as triethanolamine or triisopropanolamine, or a carboxyl group-containing organic acid, such as adipic acid, citric acid, succinic acid, or lactic acid, is preferably contained since the pH adjusting effect can be more stably obtained.

1.5.4. Water

The sublimation transfer ink jet ink composition according to this embodiment may include water. As the water, for example, pure water, such as ion-exchanged water, ultrafiltrated water, reverse osmosis water, or distilled water, or water, such as ultrapure water, in which ionic impurities are removed as much as possible may be mentioned. In addition, by the use of water sterilized, for example, by UV-ray radiation or by addition of hydrogen peroxide, when the sublimation transfer ink jet ink composition is stored for a long time, the generation of bacteria and fungi can be suppressed.

The content of water with respect to the total amount of the sublimation transfer ink jet ink composition is 30 percent by mass or more, preferably 40 percent by mass or more, more preferably 45 percent by mass or more, and further preferably 50 percent by mass or more. Since the content of water is 30 percent by mass or more, the sublimation transfer ink jet ink composition may have a relatively low viscosity, and hence, the ejection stability is improved. In addition, the upper limit of the water content with respect to the total amount of the sublimation transfer ink jet ink composition is preferably 90 percent by mass or less, more preferably 85 percent by mass or less, and further preferably 80 percent by mass or less.

1.5.5. Urea

As a moisturizing agent of the sublimation transfer ink jet ink composition or a dyeing auxiliary agent improving the dyeing property of the dye, if needed, an urea may also be used. As a particular example of the urea, for example, there may be mentioned urea, ethylene urea, tetramethylurea, thiourea, or 1,3-dimethyl-2-imidazolidinone.

1.5.6. Sugar

For solidification of the sublimation transfer ink jet ink composition, if needed, a sugar may also be used. As a particular example of the sugar, for example, there may be mentioned glucose, mannose, fructose, ribose, xylose, arabinose, galactose, aldonic acid, glucitol (sorbit), maltose, cellobiose, lactose, sucrose, trehalose, or maltotriose.

1.5.7. Chelating Agent

For the sublimation transfer ink jet ink composition, if needed, a chelating agent may also be used. As the chelating agent, for example, there may be mentioned ethylenediaminetetraacetic acid or a salt thereof (disodium dihydrogen ethylenediaminetetraacetate; or a nitrilotriacetate, a hexametaphosphate, a pyrophosphate, or a metaphosphate of ethylenediamine).

1.5.8. Antiseptic Agent and Fungicide

For the sublimation transfer ink jet ink composition, if needed, an antiseptic agent and/or a fungicide may also be used. As the antiseptic agent and the fungicide, for example, there may be mentioned sodium benzoic acid, sodium pentachlorophenol, sodium 2-pyridinethiol-1-oxide, sodium sorbate, sodium dehydroacetate, 1,2-benzthiazoline-3-one (such as Proxel CRL, Proxel BDN, Proxel GXL, Proxel XL. 2, Proxel TN, or Proxel LV, manufactured by Zeneca Inc.), or 4-chloro-3-methylphenol (such as Preventol CMK, manufactured by Bayer).

1.5.9. Others

Furthermore, as components other than those described above, for example, if needed, additives, such as an anti-rust agent, an antioxidant, an UV absorber, an oxygen absorber, and a solubility auxiliary agent, which are generally used in an ink jet ink composition may also be contained.

1.6. Physical Properties of Sublimation Transfer Ink Composition and Manufacturing Thereof In the ink jet ink composition of this embodiment, the mixture which includes all the components other than the disperse dye and the dispersing resin has a cloud point of 40° C. or more. In addition, the cloud point is, for example, 45° C. or more, preferably 50° C. or more, and more preferably 55° C. or more. The cloud point is a cloud point of components (liquid) obtained from the ink composition other than the disperse dye and the dispersing resin and may be measured, for example, by a measurement device shown in FIG. 1 described in JP-A-2015-117297. As a schematic structure of the measurement device, a temperature controllable cell connected to a circulation type constant-temperature bath is provided in a spectrophotometer. A thermocouple is inserted in the cell so as to be contactable with a liquid therein, and the temperature in the cell is configured to be measured by a data logger electrically connected to the thermocouple. In addition, after an object to be measured is placed in the cell, heating of the cell is started using the circulation type constant-temperature bath, and while the liquid temperature of the object to be measured is monitored, the transmittance of the composition in a visible light range (300 to 800 nm) is measured by the spectrophotometer, for example, at a measurement interval of 0.5° C., so that a temperature at which the transmittance is decreased by 10% of the initial transmittance is obtained as the cloud point.

The sublimation transfer ink jet ink composition of this embodiment has a surface tension of 30 mN/m or less. In this case, the value of the surface tension is a value measured at 25° C. Although changed depending on a material to be contained, the surface tension of the sublimation transfer ink jet ink composition is changed relatively strongly dependent on the amount of the silicone-based surfactant described above as compared to that of the other material. Hence, as a method in which the surface tension is set to 30 mN/m or less, the adjustment of the amount of the silicone-based surfactant may be effective in many cases.

The surface tension of the sublimation transfer ink jet ink composition of this embodiment at 25° C. is preferably mN/m or less, more preferably 25 mN/m or less, and further preferably 23 mN/m or less. In addition, for the measurement of the surface tension, by the use of an automatic surface tension meter CBVP-Z (manufactured by Kyowa Interface Science Co., Ltd.), a surface tension obtained when a platinum plate is wetted with the composition in an environment at 25° C. is confirmed.

In addition, the viscosity of the sublimation transfer ink jet ink composition at 20° C. is preferably 1.5 to 10 mPa·s and more preferably 2 to 8 mPa·s. In order to set the surface tension and the viscosity in the respective ranges described above, the types of water-soluble organic solvent and surfactant described above, the addition amounts thereof, the addition amount of water, and the like may be appropriately adjusted. In addition, for the measurement of the viscosity, by the use of a viscoelastic test device MCR-300 (manufactured by Pysica), while a Shear Rate is increased from 10 to 1,000 in an environment at 20° C., a viscosity at a Shear Rate of 200 is read.

In the ink jet ink composition of this embodiment, the pH is 5.8 to 10.5, preferably 6.0 to 10.0, more preferably 6.0 to 9.5, and further preferably 7.0 to 8.5. When the pH of the ink jet ink composition is in the range described above, for example, members of a recording head and an ink jet recording device can be suppressed from being corroded.

The sublimation transfer ink jet ink composition of this embodiment can be obtained in such a way that the individual components described above are mixed together in an arbitrary order, and if needed, impurities are then removed by filtration and the like. As a method for mixing the components, there may be preferably used a method in which after the materials are sequentially charged in a container equipped with a stirring device, such as a mechanical stirrer or a magnetic stirrer, stirring and mixing are performed. In addition, the disperse dye may be added in a dispersion form in which the disperse dye is dispersed in advance by the dispersing resin.

1.7. Operational Advantages

According to the sublimation transfer ink jet ink composition of this embodiment, the odor generated during printing is suppressed, the filling property into a head is preferable, and the storage stability is excellent so that the physical properties are not likely to be changed during the storage. That is, according to the sublimation transfer ink jet ink composition described above, since the dispersing resin is contained, the dispersibility of the disperse dye is not only improved, but also the odor is suppressed during printing, and since the solubilizer which appropriately controls the cloud point of the mixture which includes all the components of the sublimation transfer ink jet ink composition other than the disperse dye and the dispersing resin is contained, the interaction between the dispersing resin and the silicone-based surfactant is suppressed, and as a result, the effect of improving the filling property into a head and the effect of decreasing the surface tension by the silicone-based surfactant are not likely to be changed with time. Accordingly, for example, even after the sublimation transfer ink jet ink composition is stored, since the initial physical properties can be maintained, the image quality of a printed material can be made unlikely to be changed before and after the storage.

2. Sublimation Transfer Ink Jet Recording Method

The sublimation transfer ink jet ink composition described above can be preferably applied to a dyeing method (sublimation transfer ink jet recording method) performed on a cloth or the like using the sublimation transfer. The sublimation transfer ink jet recording method of this embodiment may also be called a manufacturing method of a transfer-source recorded material and/or a manufacturing method of a printed material (such as a dyed transfer-destination cloth).

As the dyeing method using the sublimation transfer, for example, there may be mentioned a method in which after printing is performed on a sheet-shaped intermediate transfer medium (transfer-source medium or the like), such as paper, using an ink composition containing a sublimation type dye (disperse dye), the intermediate transfer medium is overlapped on a transfer-destination medium, such as a cloth, and the sublimation transfer is performed thereon by heating. The recording method of this embodiment at least includes an ejection step of ejecting the sublimation transfer ink jet ink composition described above from a recording head so that the ink compositions is adhered to a transfer-source medium (intermediate transfer medium such as paper) and a recording step (transfer step) of transferring a disperse dye contained in the sublimation transfer ink jet ink composition from the transfer-source medium by the sublimation transfer to a recording medium (such as a cloth).

2.1. Ejection Step

In this step, by the use of an ink jet method, the sublimation transfer ink jet ink composition is ejected from the recording head so that the ink composition is adhered to a recording surface of the intermediate transfer medium (transfer source (such as paper)). The ejection of the composition by the ink jet method may be performed using a liquid droplet ejection device (such as an ink jet recording device).

2.2. Recording Step

The sublimation transfer ink jet recording method of this embodiment includes a step in which while a recording surface of the intermediate transfer medium (transfer-source medium) to which the sublimation transfer ink jet ink composition is applied is placed to face a material to be printed (such as a cloth) (in the state in which the cloth or the like is disposed so as to face the recording surface of the transfer-source medium), heating is performed so that the disperse dye contained in the ink jet ink composition is transferred (recorded) by sublimation to the material to be printed. Accordingly, a printed material is obtained using a cloth or the like as a material to be printed.

Although a heating temperature in the transfer step is not particularly limited, the temperature is 160° C. to 220° C. and preferably 170° C. to 200° C. Accordingly, sufficient energy for transferring the disperse dye to the material to be printed can be obtained, and hence the productivity of the printed material can be improved.

Although a heating time in the transfer step depends on the heating temperature, the time is 30 to 90 seconds and preferably 45 to 60 seconds. Accordingly, sufficient energy for transferring the disperse dye to the material to be printed can be obtained, and hence the productivity of the printed material can be improved.

In addition, although the transfer step may be performed by heating while the intermediate transfer medium to which the ink jet ink composition is applied and the material to be printed are disposed to face each other, heating is more preferably performed while the intermediate transfer medium and the material to be printed are in a close contact with each other. Accordingly, a clearer image can be recorded (printed) on a cloth or the like.

As the material to be printed, for example, a sheet-shaped material, such as a cloth (hydrophobic fiber cloth or the like) or a resin (plastic) film, may be preferably used, and a material having a stereoscopic shape, such as a material having a spherical shape, a rectangular parallelepiped, or a curved surface, may also be used.

In addition, as the material to be printed, for example, besides a material formed from a resin or a plastic, a glass, a metal, or a ceramic may also be used. In addition, as fibers forming a cloth to be used as the material to be printed, for example, there may be mentioned polyester fibers, nylon fibers, triacetate fibers, diacetate fibers, polyamide fibers, or mixed-spun fibers using at least two of the fibers mentioned above. In addition, regenerated fibers, such as rayon, or mixed-spun fibers with natural fibers, such as cotton, silk, or wool, may also be used. As the resin (plastic) film to be used as the material to be printed, for example, a polyester film, a polyurethane film, a polycarbonate film, a poly(phenylene sulfide) film, a polyimide film, or a poly(amide imide) film may be mentioned. The resin (plastic) film may be a laminate including layers laminated to each other or a may be formed of a gradient material in which the composition of the material is gradually changed.

2.3. Other Steps

The recording method of this embodiment may include a first heating step of heating the transfer-source medium after the ejection step. The first heating step is a step of performing heating after the sublimation transfer ink jet ink composition is ejected to the transfer-source medium (intermediate transfer medium). Since the first heating step is performed, drying of the sublimation transfer ink jet ink composition adhered in the ejection step is promoted, bleeding of an image is not only suppressed, but also offset may also be suppressed in some cases. In addition, the "offset" indicates a phenomenon in which, for example, when the transfer-source medium is wound with a roller so as to be overlapped by itself, a component of the ink jet ink composition is transferred to a rear surface which is brought into contact with the recording surface.

A reaching temperature of the transfer-source medium in the first heating step is preferably 60° C. or more, more preferably 70° C. to 120° C., and further preferably 70° C. to 110° C. When the reacting temperature is in the range as described above, the disperse dye is not likely to sublimate, and a preferable drying rate can be obtained.

Furthermore, the sublimation transfer ink jet recording method of this embodiment may include a second heating step of heating at least one of the recording head and the transfer-source medium in the ejection step. The sublimation transfer ink jet ink recording method of this embodiment may further include a step of disposing a cloth on the recording surface of the transfer-source medium and a step of heating the transfer-source medium and the cloth.

According to the recording method as described above, since the sublimation transfer ink jet ink composition of this embodiment is used, the odor is suppressed, and in addition, a printing having a preferable image quality can be performed.

2.4. Device Structure Used for Recording Method

The sublimation transfer ink jet ink composition of this embodiment may be preferably used for an ink jet recording device. The ink jet recording device at least includes an ink receiving container (a cartridge, a tank, or the like) receiving the sublimation transfer ink jet ink composition described above and a recording head connected to the container and is not particularly limited as long as the composition can be ejected from the recording head to form an image on the intermediate transfer medium (transfer source).

As the ink jet recording device of this embodiment, either a serial type or a line type may be used. In each of the ink jet recording devices of those types described above, a recording head is mounted, a predetermined volume (mass) of a liquid droplet of the ink jet ink composition is (intermittently) ejected from a nozzle hole of the recording head while the relative positional relationship between the transfer-source medium and the recording head is changed, and the ink jet ink composition is adhered to the transfer-source medium, so that a predetermined image can be formed.

In general, in the serial type ink jet recording device, a transport direction of the recording medium and a reciprocal movement direction of the recording head are intersected to each other, and by the combination between the reciprocal movement of the recording head and the transport movement (also including a reciprocal movement) of the recording medium, the relative positional relationship between the recording medium and the recording head is changed. In addition, in this case, in general, a plurality of nozzle holes (holes ejecting the ink composition) is disposed in the recording head, and at least one line (nozzle line) of the nozzle holes is formed along the transport direction of the recording medium. In addition, in the recording head, in accordance with the types of ink compositions and the number thereof, a plurality of nozzle lines may be formed in some cases.

In addition, in general, in the line type ink jet recording device, the reciprocal movement of the recording head is not performed, the relative positional relationship between the recording medium and the recording head is changed by the transport of the recording medium. In this case, in general, a plurality of nozzle holes is disposed in the recording head, and along the direction intersecting the transport direction of the recording medium, lines (nozzle lines) of the nozzle holes are formed.

Although the ink jet recording method uses a serial type or a line type ink jet recording device, the type is not particularly limited as long as the ink composition can be ejected in the form of liquid droplets from fine nozzle holes so as to be adhered to the recording medium. For example, as a liquid droplet ejection method (ink jet method), there may be used a piezoelectric method or a method in which an ink is ejected by foam (bubbles) generated by heating of the ink, and for example, since the ink composition is not likely to be changed by heating, a piezoelectric method is preferable.

In the ink jet recording device used in this embodiment, for example, known structures, such as a heating unit, a drying unit, a roll unit, and a winding unit, may also be used without any particular limitation.

2.5. Operational Advantages

According to the recording method of this embodiment, since the sublimation transfer ink jet ink composition described above is used, the odor is suppressed, and in addition, a printing having a preferable image quality can be performed. In addition, a preferable transfer-source medium (recorded material) in which bleeding and offset are suppressed can be formed. In addition, since the sublimation transfer ink jet ink composition described above is used, even after the composition is stored, a preferable transfer-source medium (recorded material) can be formed.

3. Examples and Comparative Examples

Hereinafter, although the invention will be described in more detail with reference to examples, the invention is not limited thereto.

3.1. Preparation of Ink Jet Ink Composition

After individual components were placed in a container to have the composition as shown in Table 1 and were then mixed and stirred for 2 hours by a magnetic stirrer, filtration was performed using a membrane filter having a pore diameter of 5 µm, so that a first ink and a second ink (ink jet ink compositions) according to each of examples and comparative examples were obtained. In addition, the first ink and the second ink used in each example had the same composition except for that the disperse dyes were different from each other. In addition, the numerical value shown in Table 1 indicates the percent by mass on solid content basis.

TABLE 1

| INK COMPOSITION | | EXAMPLE | | | | | | | | |
|---|---|---|---|---|---|---|---|---|---|---|
| | | 1 | 2 | 3 | 4 | 5 | 6 | 7 | 8 | 9 |
| DIS-PERSE DYE | Disperse Red 60 | 6.8 | 6.8 | 6.8 | 6.8 | 6.8 | 1.7 | — | — | — |
| | Disperse Yellow 54 | — | — | — | — | — | — | 3 | — | — |
| | Disperse Blue 359 | — | — | — | — | — | — | — | 5 | — |
| | Disperse Blue 360 | — | — | — | — | — | — | — | — | 5 |
| | Disperse Orange 25 | — | — | — | — | — | — | — | — | — |

TABLE 1-continued

|  |  |  |  |  |  |  |  |  |  |  |
|---|---|---|---|---|---|---|---|---|---|---|
|  | Solvent Orange 60 | — | — | — | — | — | — | — | — | — |
| DISPERSING RESIN | ACRYL-BASED RESIN | 3.4 | 3.4 | — | — | 1.36 | 3.4 | 1.5 | 2.5 | 2.5 |
|  | STYRENE-BASED RESIN | — | — | 3.4 | — | — | — | — | — | — |
|  | URETHANE-BASED RESIN | — | — | — | 3.4 | — | — | — | — | — |
|  | NSF | — | — | — | — | — | — | — | — | — |
| SURFACTANT | BYK349 | 0.8 | 0.8 | 0.8 | 0.8 | 0.8 | 0.8 | 0.8 | 0.8 | 0.8 |
|  | OLFIN E1010 | — | — | — | — | — | — | — | — | — |
| SOLUBILIZER | PELEX SS-H | 1 | — | 1 | 1 | 1 | 1 | 1 | 1 | 1 |
|  | INOGEN EA-137 | — | 1 | — | — | — | — | — | — | — |
| ORGANIC SOLVENT | GLYCERIN | 15 | 15 | 15 | 15 | 15 | 15 | 15 | 15 | 15 |
|  | PROPYLENE GLYCOL | 5 | 5 | 5 | 5 | 5 | 10 | 5 | 5 | 5 |
|  | METHYL TRIGYCOL | 3 | 3 | 3 | 3 | 3 | 3 | 3 | 3 | 3 |
| WATER | ION-EXCHANGED WATER | BALANCE | BALANCE | BALANCE | BALANCE | BALANCE | BALANCE | BALANCE | BALANCE | BALANCE |
|  | TOTAL | 100 | 100 | 100 | 100 | 100 | 100 | 100 | 100 | 100 |
|  | RESIN/DYE MASS RATIO | 50% | 50% | 50% | 50% | 20% | 200% | 50% | 50% | 50% |
|  | CLOUD POINT (° C.) | 45 | 45 | 44 | 43 | 42 | 44 | 42 | 42 | 45 |
|  | SURFACE TENSION (mN/m) | 24.3 | 26 | 24.1 | 24.5 | 24 | 25.7 | 23.8 | 24.2 | 25.2 |
| EVALUATION | FILLING PROPERTY INITIAL STAGE | A | A | A | A | A | A | A | A | A |
|  | FILLING PROPERTY 60° C. 30 D | A | A | A | A | A | B | A | A | A |
|  | EJECTION STABILITY | A | B | A | A | A | B | A | A | A |
|  | ODOR | A | A | A | A | A | A | A | A | A |
|  | STORAGE STABILITY | A | A | A | A | A | A | A | A | A |
|  | IMAGE QUALITY | A | A | A | A | A | A | A | A | A |

|  |  | EXAMPLE |  |  |  |  | COMPARATIVE EXAMPLE |  |  |  |
|---|---|---|---|---|---|---|---|---|---|---|
| INK COMPOSITION |  | 10 | 11 | 12 | 13 | 14 | 1 | 2 | 3 | 4 |
| DISPERSE DYE | Disperse Red 60 | — | — | — | 6.8 | 6.8 | 6.8 | 6.8 | 6.8 | 6.8 |
|  | Disperse Yellow 54 | — | — | 0.4 | — | — | — | — | — | — |
|  | Disperse Blue 359 | — | — | — | — | — | — | — | — | — |
|  | Disperse Blue 360 | — | — | 2 | — | — | — | — | — | — |
|  | Disperse Orange 25 | 4.4 | — | 1.5 | — | — | — | — | — | — |
|  | Solvent Orange 60 | — | 4.4 | 1.5 | — | — | — | — | — | — |
| DISPERSING RESIN | ACRYL-BASED RESIN | 2.2 | 2.2 | 2.7 | 2 | 2.5 | — | 3.4 | 3.4 | 3.4 |
|  | STYRENE-BASED RESIN | — | — | — | 0.5 | — | — | — | — | — |
|  | URETHANE-BASED RESIN | — | — | — | — | — | — | — | — | — |
|  | NSF | — | — | — | — | — | 3.4 | — | — | — |
| SURFACTANT | BYK349 | 0.8 | 0.8 | 0.8 | 0.8 | 0.8 | 0.8 | 0.09 | 0.8 | — |
|  | OLFIN E1010 | — | — | — | — | — | — | — | — | 0.8 |
| SOLUBILIZER | PELEX SS-H | 1 | 1 | 1 | 1 | 0.7 | — | 1 | — | 1 |
|  | INOGEN EA-137 | — | — | — | — | 0.3 | — | — | — | — |
| ORGANIC SOLVENT | GLYCERIN | 15 | 15 | 15 | 15 | 15 | 15 | 15 | 15 | 15 |
|  | PROPYLENE GLYCOL | 5 | 5 | 5 | 5 | 5 | 5 | 5 | 5 | 5 |
|  | METHYL TRIGYCOL | 3 | 3 | 3 | 3 | 3 | 3 | 3 | 3 | 3 |
| WATER | ION-EXCHANGED WATER | BALANCE | BALANCE | BALANCE | BALANCE | BALANCE | BALANCE | BALANCE | BALANCE | BALANCE |
|  | TOTAL | 100 | 100 | 100 | 100 | 100 | 100 | 100 | 100 | 100 |
|  | RESIN/DYE MASS RATIO | 50% | 50% | 50% | 50% | 50% | 0% | 50% | 50% | 50% |
|  | CLOUD POINT (° C.) | 44 | 42 | 43 | 44 | 44 | 45 | 45 | 34 | 45 |

TABLE 1-continued

| | | | | | | | | | | |
|---|---|---|---|---|---|---|---|---|---|---|
| SURFACE TENSION (mN/m) | | 24.9 | 25.2 | 25.5 | 24.1 | 24.8 | 24 | 32 | 24.3 | 30.4 |
| EVALU-ATION | FILLING PROPERTY INITIAL STAGE | A | A | A | A | A | A | B | A | B |
| | FILLING PROPERTY 60° C. 30 D | A | A | B | A | A | A | C | C | C |
| | EJECTION STABILITY | A | A | B | A | A | A | B | C | B |
| | ODOR | A | A | A | A | A | C | A | A | A |
| | STORAGE STABILITY | A | A | A | A | A | A | A | C | A |
| | IMAGE QUALITY | A | A | A | A | A | A | C | C | A |

In Table 1, components other than those represented by the color indexes or the compound names are as shown below. In addition, in Table 1, as the resin/dye mass rate, the mass rate (dispersing resin/disperse dye) of the dispersing resin to the disperse dye is shown. In addition, the term "C. I." (color index) of the disperse dye is omitted.

Acryl-based resin: Aron A-6114 (obtained from Toagosei Co., Ltd., solid content: 40%, a carboxylic acid-based copolymer (ammonium salt)) (the amount in the table is based on solid content).

Styrene-based resin: Nopco Sperse 6100 (obtained from San Nopco Limited., solid content: 70%, a styrene-maleic acid amine salt (the amount in the table is based on solid content).

Urethane-based resin: TEGO Dispers 710 (obtained from Evonik Tego Chemie, active ingredient amount: 35%, a urethane copolymer solution) (the amount in the table is based on solid content).

NSF: sodium salt of β-naphthalenesulfonic acid formalin condensate (obtained from Kao Corporation).

BYK-349: silicone-based surfactant (obtained from BYK-Chemie).

Olfin E1010: acetylene-based surfactant (obtained from Nisshin Chemical Industry Co., Ltd.).

Pelex SS-H: alkyldiphenyl ether disulfonic acid salt (obtained from Kao Corporation).

Inogen EA-137: polyoxyethylene styrenated phenyl ether (obtained from DKS Co., Ltd.).

3.2. Physical Properties and Evaluation Methods
3.2.1. Cloud Point

An evaluation sample was formed using components (liquid) obtained from the ink composition of each example other than the disperse dye and the dispersing resin, and the cloud point of the evaluation sample was measured. The cloud point was measured using a measurement device as shown in FIG. 1 of JP-A-2015-117297. As a schematic structure of the measurement device, a temperature controllable cell connected to a circulation type constant-temperature bath was provided in a spectrophotometer. A thermocouple was inserted in the cell so as to be contactable with a liquid therein, and the temperature in the cell is configured to be measured by a data logger electrically connected to the thermocouple. In addition, the composition of each example was placed in the cell, heating of the cell was started using the circulation type constant-temperature bath, and the transmittance of the composition in a visible light range (300 to 800 nm) was measured by the spectrophotometer while the liquid temperature of the composition was monitored. The measurement interval was set to 0.5° C., and a temperature at which the transmittance was decreased by 10% of the initial transmittance was regarded as the cloud point. The measurement devices used in this evaluation were as follows. The measurement results of the cloud points thus obtained are also shown in Table 1.

Measurement Devices
Spectrophotometer: Jasco UV-Visible spectrophotometer (UV-VIS) V-570 type
Circulation Type Constant-Temperature Bath: LAUDA circulation type constant-temperature bath E100
Liquid Temperature Monitor: NKTC Data Logger N542R 3.2.2. Surface Tension The surface tension of the sublimation transfer ink jet ink composition of each example immediately after the manufacturing was measured at a liquid temperature of 25° C. in accordance with Wilhelmy method using a surface tension meter (surface tension meter CBVP-Z, manufactured by Kyowa Interface Science Co., Ltd.). The results are shown in Table 1.

3.2.3. Filling Property

An ink jet printer (SureColor SC-F6000, manufactured by Seiko Epson Corporation) was prepared, and the state in which no ink was present in a recording head was formed. Subsequently, by the use of the composition immediately after the manufacturing and the composition after being left at 60° C. for 30 days of each example, after the composition was filled into the recording head in accordance with the standard sequence of the printer, the filling property into the recording head was investigated, and the evaluation thereof was performed in accordance with the following criteria.

A: Filling can be performed into all nozzles only by one cleaning treatment.

B: Filling can be performed into all nozzles when one additional cleaning is performed.

C: At least three cleaning operations are required when filling is performed into all nozzles.

3.2.4. Ejection Stability

After the composition immediately after the manufacturing and the composition after being left at 60° C. for 30 days of each example were filled in an ink jet printer (SureColor SC-F6000, manufactured by Seiko Epson Corporation), and a solid pattern (fill at a duty of 100%) was recorded on B0 size paper used as a recording material in an environment at 40° C. so as to perform an ejection stability test, the evaluation was performed in accordance with the following criteria, and the results are shown in Table 1. In addition, the initial filling was performed at 25° C.

A: The composition immediately after the manufacturing and the composition after being left at 60° C. for 30 days can be continuously recorded on 15 sheets or more without dot missing and dot displacement.

B: The composition immediately after the manufacturing or the composition after being left at 60° C. for 30 days can be continuously recorded on 10 to less than 15 sheets without dot missing and dot displacement.

C: The composition immediately after the manufacturing or the composition after being left at 60° C. for 30 days can be continuously recorded on less than 10 sheets without dot missing and dot displacement.

3.2.5. Odor

After the composition immediately after the manufacturing of each example was filled in an ink jet printer (Sure-Color SC-F6000, manufactured by Seiko Epson Corporation, a TFP head was mounted), and printing of a pattern similar to that of the ejection stability test was continuously performed for 8 hours, a sensory evaluation of the odor in the vicinity of the ink jet printer (area within 1 m) was performed (by 10 evaluators in an environment at 25° C.), and the evaluation was performed in accordance with the following criteria. The results are shown in Table 1.

The number of evaluators who sense no uncomfortable odor during working is:

A: 7 to 10 evaluators
B: 4 to 6 evaluators
C: less than 3 evaluators 3.2.6. Storage Stability An increase in surface tension of the composition after being left at 60° C. for 30 days from that of the composition immediately after the manufacturing of each example was measured. The surface tension was measured in a manner similar to that performed for the surface tension of the composition immediately after the manufacturing described above. In addition, the difference in surface tension before and after the accelerating test was calculated and then evaluated in accordance with the following criteria, and the results are shown in Table 1.

The difference in surface tension is:

A: 0 to less than 1 mN/m
B: 1 to less than 2 mN/m
C: 2 mN/m or more 3.2.7. Image Quality By the use of an ink jet printer (SureColor SC-F6000, manufactured by Seiko Epson Corporation) filled with the composition of each example, printing of Japanese characters, "hark" and "eagle", having a 6 point font size, those two characters being very similar to each other and each having a large number of stroke counts, was performed on a recording medium (Transjet Sportsline (manufactured by Cham Paper Group) at a print resolution of 720 dpi in a lateral direction and 720 dpi in a longitudinal direction, and whether the visual recognition of the characters can be performed or not was investigated. The evaluation was performed in accordance with the following criteria, and the results are shown in Table 1. In addition, the printing environment was at a temperature of 25° C. and a relative humidity of 60%.

A: The composition immediately after the manufacturing and the composition after being left at 60° C. for 30 days are not bled, and the characters thereof each having a 6 point font size can be clearly recognized by visual inspection.

B: Compared to the composition immediately after the manufacturing, although the composition after being left at 60° C. for 30 days is slightly bled, the characters thereof each having a 6 point font size can be recognized by visual inspection.

C: Compared to the composition immediately after the manufacturing, the composition after being left at 60° C. for 30 days is seriously bled, and the characters thereof each having a 6 point font size cannot be recognized by visual inspection.

3.3. Evaluation Results

It was found that according to the sublimation transfer ink jet ink composition of each example in which the disperse dye, the dispersing resin, the silicone-based surfactant, and the solubilizer are included, the surface tension is 30 mN/m or less, and the cloud point of the mixture which includes all the components other than the disperse dye and the dispersing resin is 40° C. or more, the filling property into the head, the ejection stability, the odor, the storage stability, and the image quality are all excellent. That is, it was found that the sublimation transfer ink jet ink composition of each example can be printed while the odor is suppressed and is excellent in storage stability so that the physical properties are not likely to be changed during the storage.

On the other hand, in the composition of Comparative Example 1, since a sodium salt of β-naphthalenesulfonic acid formalin condensate was used as the dispersant for the disperse dye, the odor was inferior. In addition, in the composition of Comparative Example 2 in which the solubilizer was not contained, and the initial surface tension was high, the filling property after the storage and the image quality were not sufficient. The reason for this is believed that since the silicone-based surfactant is adsorbed by the dispersing resin from the beginning and is then gradually adsorbed thereby, the surface activation ability of the composition is degraded, and the surface tension is increased. Furthermore, according to the results of Comparative Example 3, the cloud point was decreased, and the filling property after the storage, the ejection stability, the storage stability, and the image quality were inferior. The reason for this is believed that although a relatively large amount of the silicone-based surfactant is contained, since the solubilizer is not contained, a phenomenon generated by gradual adsorption of the silicone-based surfactant to the dispersing resin occurs. On the other hand, in Comparative Example 4 in which the acetylene-based surfactant was only used instead of using the silicone-based surfactant, although a low surface tension could be maintained, the filling property into the head could not be satisfied.

The invention is not limited to the embodiments described above and may be variously modified. For example, the invention includes substantially the same structure (such as the same structure relating to the function, the method, and the result or the same structure relating to the object and the effect) as that described in one of the embodiments. In addition, the invention includes the structure in which a nonessential portion of the structure described in one of the embodiments is replaced. In addition, the invention includes the structure that obtains the same operational advantage as that of the structure described in one of the embodiments or the structure that achieves the same object as that of the structure described in one of the embodiments. Furthermore, the invention includes the structure in which a known technique is imparted to the structure described in one of the embodiments.

The entire disclosure of Japanese Patent Application No. 2017-144813, filed Jul. 26, 2017 is expressly incorporated by reference herein.

What is claimed is:

1. A sublimation transfer ink jet ink composition comprising:
   a disperse dye;
   a dispersing resin;
   a silicone-based surfactant; and
   a solubilizer, wherein the sublimation transfer ink jet ink composition has a surface tension of 30 mN/m or less, the solubilizer is at least one selected from an alkyldiphenyl ether disulfonic acid, a salt thereof, and a polyoxyethylene styrenated phenyl ether, a total content of the solubilizer with respect to 100% by mass of the sublimation transfer ink jet ink composition is 0.1 to 5% by mass, and a cloud point of a mixture which includes all the components other than the disperse dye and the dispersing resin is 40° C. or more.

2. The sublimation transfer ink jet ink composition according to claim 1, wherein the dispersing resin is at least one selected from an acryl-based resin, a styrene-based resin, and an urethane-based resin.

3. The sublimation transfer ink jet ink composition according to claim 1, wherein the mass rate (dispersing resin/disperse dye) of the dispersing resin to the disperse dye is 20% to 200%.

4. The sublimation transfer ink jet ink composition according to claim 1, wherein the disperse dye contains at least one selected from DR60, DY54, DB359, DB360, DO25, and SO60.

5. A sublimation transfer ink jet recording method comprising:

ejecting the sublimation transfer ink jet ink composition according to claim 1 from a recording head so that the sublimation transfer ink jet ink composition is adhered to an intermediate transfer medium; and transferring the sublimation transfer ink jet ink composition to a cloth for recording.

6. A sublimation transfer ink jet recording method comprising:

ejecting the sublimation transfer ink jet ink composition according to claim 1 from a recording head so that the sublimation transfer ink jet ink composition is adhered to an intermediate transfer medium; and transferring the sublimation transfer ink jet ink composition to a cloth for recording.

7. A sublimation transfer ink jet recording method comprising:

ejecting the sublimation transfer ink jet ink composition according to claim 2 from a recording head so that the sublimation transfer ink jet ink composition is adhered to an intermediate transfer medium; and transferring the sublimation transfer ink jet ink composition to a cloth for recording.

8. A sublimation transfer ink jet recording method comprising:

ejecting the sublimation transfer ink jet ink composition according to claim 3 from a recording head so that the sublimation transfer ink jet ink composition is adhered to an intermediate transfer medium; and transferring the sublimation transfer ink jet ink composition to a cloth for recording.

9. A sublimation transfer ink jet recording method comprising:

ejecting g the sublimation transfer ink jet ink composition according to claim 4 from a recording head so that the sublimation transfer ink jet ink composition is adhered to an intermediate transfer medium; and transferring the sublimation transfer ink jet ink composition to a cloth for recording.

* * * * *